United States Patent

[11] 3,574,415

[72] Inventor Alex F. Stamm
Rochester, Mich.
[21] Appl. No. 755,076
[22] Filed Aug. 26, 1968
[45] Patented Apr. 13, 1971
[73] Assignee Rockwell-Standard Company
Pittsburgh, Pa.

[54] BRAKE SYSTEM
9 Claims, 6 Drawing Figs.
[52] U.S. Cl. ................................................ 303/21, 303/20
[51] Int. Cl. ................................................ B60t 8/08
[50] Field of Search ................................... 303/20, 21

[56] References Cited
UNITED STATES PATENTS
3,026,148 3/1962 Ruof .................. 303/21(BE)
3,232,676 2/1966 Cripe .................. 303/21(F)
3,260,555 7/1966 Packer ................ 303/21(BB)
3,441,320 4/1969 Flory .................. 303/21(BB)

Primary Examiner—Duane A. Reger
Attorneys—John R. Bronaugh, Floyd S. Levison, E. Dennis O'Connor and Richard A. Speer ABSTRACT: An automotive braking control system in which the rotational velocity of one set of wheels, usually the rear wheels is compared with the rotational velocity of another set of wheels, usually the front wheels, and a signal is generated when a velocity difference is detected during braking action, the signal being effective to reduce the braking effort supplied to the slower wheels, the braking effort at the slower wheels thereafter being a fixed percentage of the braking effort at the faster wheels or being a fixed value sufficiently low to avoid locking the slower wheels.

INVENTOR
ALEX F. STAMM

PATENTED APR 13 1971

INVENTOR
ALEX F. STAMM

BY Strauch, Nolan, Neale, Nies & Kurz
ATTORNEYS

INVENTOR
ALEX F. STAMM

ATTORNEYS

3,574,415

BRAKE SYSTEM

RELATED APPLICATIONS

Related brake control systems are disclosed and claimed in U.S. Pat. No. 3,503,654, granted Mar. 31, 1970 and in copending applications Ser. No. 41,765, filed Jun. 4, 1970 for Brake Systems, and Ser. No. 709,706 filed Mar. 1, 1968 for Brake System and each owned by applicant's assignee.

BACKGROUND OF THE INVENTION

For some time automotive vehicles have been equipped with brakes of sufficient size, capacity and reliability to lock all of the vehicle wheels under panic stop conditions. However, it has been recognized that such wheel lock is undesirable except under the most extreme conditions since it is invariably accompanied by loss of directional control. Ordinarily, because of the normal weight distribution and because of a forward weight shift which occurs during braking, the rear wheels tend to lock before locking occurs at the front wheels. Rear wheel lockup causes loss of directional control and may actually increase the total stopping distance.

In most prior existing braking systems, it is beyond the skill of the vehicle operator to achieve the ideal braking condition, particularly under emergency conditions, that is, to apply the brakes with a force slightly less than the value which will cause any of the wheels to lock. Further, deliberately limiting the braking effort to a level which will prevent rear wheel lock usually requires application of the front wheel brakes with a force which is considerably less than that which they are capable of absorbing without locking the front wheels. Operation of the brakes in this manner materially increases the vehicle stopping distance.

In recognition of these factors, there have been prior proposals to permit the application of the front wheel brakes under operator control and to limit automatically the braking effort applied to the rear wheels to a value below that which will create rear wheel lockup. Several such proposals, which have been tested with success, are disclosed in the aforementioned related applications. Certain of these proposals involve pulsing of the airbrake system which has been found to occasion an undesirable expenditure of air from the system which may unduly deplete the high-pressure air source. Other proposals, while quite satisfactory in operation, are relatively complex and correspondingly, costly.

SUMMARY OF THE INVENTION

It is an important object of the present invention to provide an improved brake control system for limiting the application of one set of vehicle wheel brakes to prevent lockup of the one set of brakes, the system being of simplified construction and correspondingly reduced cost.

In attaining this and other objects, the present invention provides a brake control system which includes a mechanism for comparing the rotational velocity of one or more wheels of one wheel set with the rotational velocity of one or more wheels of another set and generating a control signal when a difference in rotational velocity is detected, and a valving mechanism actuated in response to the control signal for essentially instantaneously reducing the braking effort applied to the brakes associated with the slower wheels.

In a preferred form, the braking effort is reduced to a predetermined percentage of the effort applied to the faster wheels, the percentage being maintained despite variations in the effort applied to the faster wheels. The reduction of braking effort is maintained until the differential wheel speed is eliminated or the brakes are released.

In another form, the braking effort applied to the slower wheels is reduced and is maintained at its reduced level regardless of an increase in the braking effort supplied to the faster wheels until the speed differential disappears or until the brakes are released. In a third form, the system is effective to reduce the effort applied to the slower wheels to a predetermined percentage of the effort applied to the faster wheels and the level of braking effort will remain at its reduced value until the speed differential disappears or until the braking effort applied to the faster wheels is increased or decreased by a predetermined amount in which even the braking effort applied to the slower wheels is increased or decreased correspondingly.

In all forms of the invention, provision is made for fail safe operation, i.e., the system permits application of full braking effort to all of the wheels in the event of front wheel lockup or in the event that the system pressure rises above a predetermined value indicative of the requirement of a true emergency stop in which it is desired that full braking effort in all wheels be utilized.

It is a further object of the present invention to provide improved brake control systems, effective in response to a detected condition of incipient wheel lock in one set of wheels, to reduce, by a predetermined step, the braking effort applied to the one set of wheels, the reduced braking effort being maintained without pulsing until the incipient wheel lock condition disappears or the brakes are released.

It is also an object of the present invention to provide improved brake control systems which utilize, to a greater extent than heretofore possible, conventional commercially available components.

Additional objects and advantages will become apparent as the description proceeds in connection with the accompanying drawings.

DESCRIPTION OF THE PREFERRED EMBODIMENTS

Figure 1:
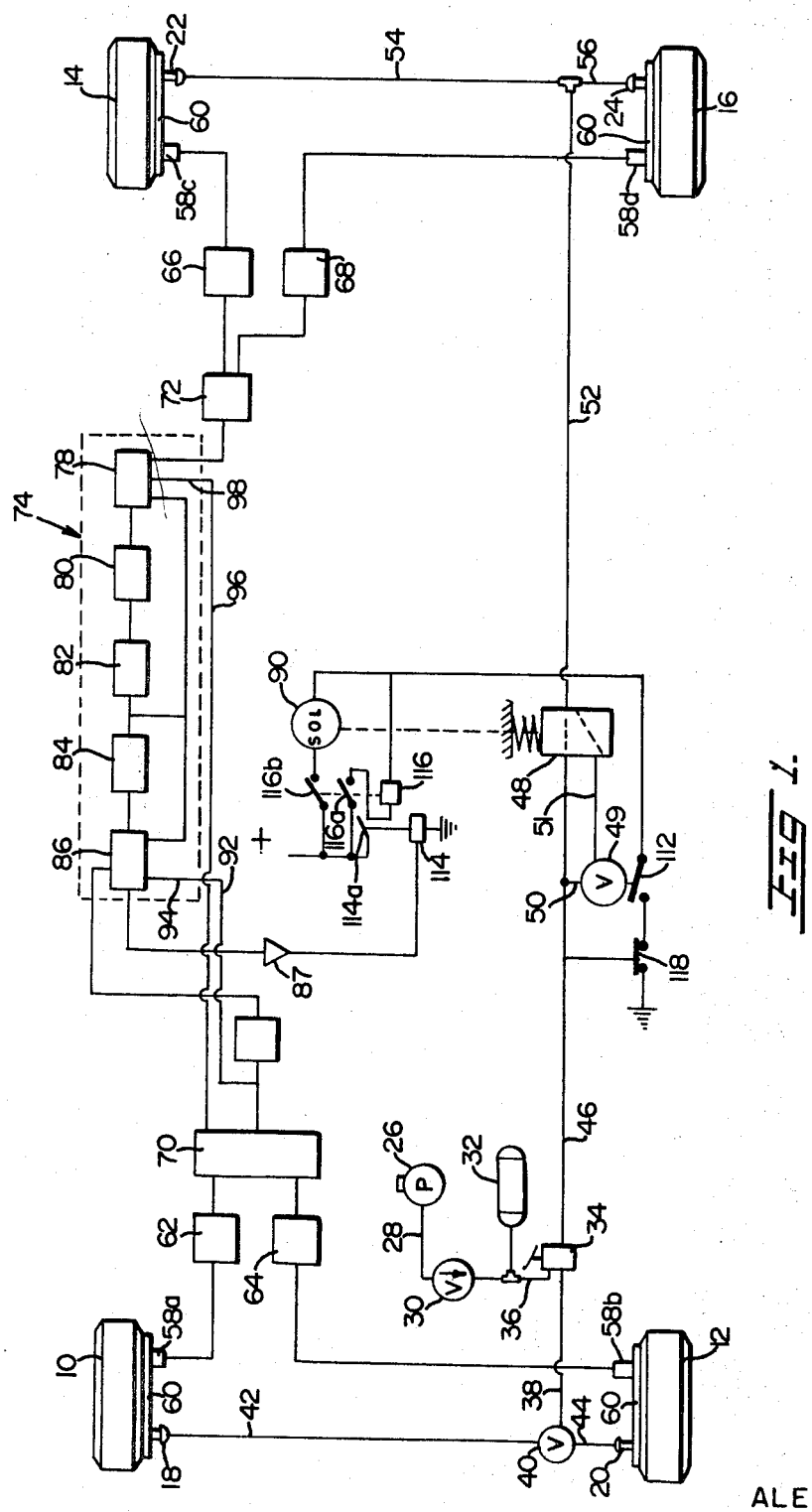
FIG. 1 is a schematic illustration of one form of the brake control system in accordance with the present invention.

For present purposes, the control systems of the present invention will be disclosed as applied to a passenger vehicle or light truck having front wheels 10 and 12 and rear wheels 14 and 16 equipped with conventional airbrake mechanisms 18 and 20, 22 and 24.

The basic brake system is completely conventional and, in the absence of an actual or incipient wheel lock condition, operates in the normal manner. It comprises the usual engine driven compressor 26 which delivers pressurized air through conduit 28 and check valve 30 to a reservoir 32 connected to the inlet side of the usual foot-operated brake application valve 34 through a conduit 36. When the valve 34 is operated, air under pressure is supplied through conduit 38, valve 40 and conduits 42 and 44 to actuate the front wheel brakes 18 and 20. Air under pressure is also simultaneously delivered through conduit 46 to control valve 48, described in detail below, conduit 52 and conduits 54 and 56 to the rear wheel brake mechanisms 22 and 24.

Figure 2:
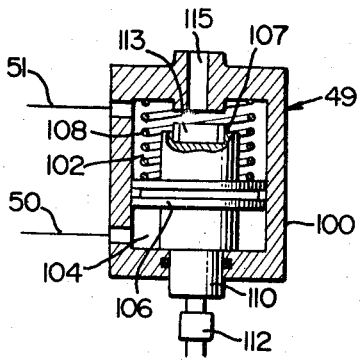
FIG. 2 is a sectional view of a pressure-reducing valve which forms an important component of the system of FIG. 1.

The high-pressure side of a pressure-reducing valve 49, shown in detail in FIG. 2, is connected to the conduit 46 by branch conduit 50 and the low-pressure side of this valve is connected to the valve 48 through a conduit 51. Under normal moderate braking conditions, valve 48 connects the conduits 46 and 52 directly and the pressure delivered to the conduit 46 is supplied without modification to the rear wheels to assure normal brake operation. As explained in detail below, when incipient rear wheel lock is detected, valve 48 is shifted to connect the conduit 46 to the conduit 52 through pressure-reducing valve 49 to reduce the braking effort at the rear wheels.

The arrangement for generating a control signal in response to incipient rear wheel lock may take a number of forms, for example, the form of the apparatus shown in any of the related applications referred to above. Preferably it takes the form of that shown in application Ser. No. 709,706 filed Mar. 1, 1968 and such a system as illustrated herein. Accordingly, the system will be described only to the extent necessary to a full understanding of the present invention and reference may be made to application Ser. No. 709,706 for further details.

Each of the vehicle wheels is equipped with a mechanism for detecting the rotational velocity of the wheel. Preferably the units each comprise an electromagnetic pickup transducer 58a, 58b, 58c and 58d associated with a notched ring 60 carried by the individual wheels. The sinusoidal output of the transducer is converted to pulses by monostable multivibrators 62, 64, 66 and 68 which generate pulse signals having a frequency which is a direct function of the speed of the individual wheels with which they are associated. The pulsed outputs of the converters 62 and 64 associated with the front wheels are fed to a comparator device 70 which produces a pulsed output signal, the frequency of which is a function of only the faster of the two front wheels or is a function of the average velocity of the two front wheels.

Similarly, the pulsed output signals of the converters 66 and 68 are fed to a comparator device 72 which produces a pulsed output signal, the frequency of which is a function of the rotational velocity of only the slower of the two rear wheels 22 and 24 or of the average velocity of the two rear wheels. The pulsed output signal of the comparator 72 is fed to a logic switch 74 which includes a frequency divider and memory unit 78, a memory selector 80, an AND gate 82, a NOT gate 84 and a flip-flop 86. The pulsed output of the front wheel comparator 70 is also fed to the switch 74 through leads 92, 94, 96 and 98.

As explained in detail in the aforesaid application Ser. No. 709,706, switch 74 is triggered to energize the amplifier 87 when the speed of the slowest rear wheel is a predetermined amount less than the speed of the fastest front wheel, or when the average speed of the rear wheels is a predetermined amount less than the average speed of the front wheels depending on the nature of the comparators 70 and 72.

In accordance with the present invention, the output of the amplifier 87 is utilized to energize a solenoid 90 which, when energized, shifts the valve 48 from its normal position connecting conduit 46 directly to conduit 52 to a second position in which this direct connection is broken and the low-pressure output conduit 51 associated with pressure-reducing valve 49 is connected to the line 52.

Referring now more particularly to FIG. 2, pressure-reducing valve 49, which is of essentially conventional construction, includes a body 100, the hollow interior of which is divided into pressure chambers 102 and 104 by a piston 106 carried by a piston rod 107. The upper chamber 102 is connected by the line 51 to the solenoid-actuated valve 48 and chamber 104 is connected by branch line 50 to the main brake pressure line 46. A spring 108, compressed between the upper end of the chamber 102 and the piston 106, normally urges the piston-piston rod assembly downward to the position shown to dispose the end of the reduced piston rod portion 110 which projects through the lower wall of body 100 in a position to maintain a microswitch 112 closed.

The upper end of the piston rod 107 carries a seal member 113 adapted to close a vent opening 115 in the upper end of the body 100 when the piston-piston rod assembly is moved to its upper limit position.

As is well known in the art, the relation between the input pressure supplied through the conduit 50 to the output pressure delivered through the conduit 51, is a function of the physical characteristics of the valve and the strength of the spring 108. In a typical case, the valve 49 may have the following characteristics:

| Pressure in | Pressure out | Percent |
| --- | --- | --- |
| 5.2 | 0 | 0 |
| 10 | 3.4 | 34 |
| 20 | 10.4 | 52 |
| 30 | 17.5 | 58 |
| 60 | 38.6 | 63 |
| 80 | 53 | 66 |

Referring again to FIG. 1, the operation of the solenoid 90, which controls the position of valve 48, is controlled by a relay 114 having a contact 114a, a relay 116 having contacts 116a and 116b, the switch 112, and a pressure switch 118 which is normally closed but is set to open when the pressure in the main brake line 46 rises to a predetermined high value, for example, 80 p.s.i.

In operation, assuming that the vehicle is at rest or is moving with the brakes released, relays 114 and 116 will be deenergized, switch 112 will be open and switch 118 closed. Thus, the solenoid 90 will be deenergized and the valve 48 is spring biased to a position to connect brake conduits 46 and 52. If the brakes are then applied with a pressure higher than 5.2 p.s.i. but insufficient to cause an incipient wheel lock at the rear wheels 14 and 16, there will be no change in the position of the components except that the piston 106 will shift to its uppermost position permitting switch 112 to close. If the applied braking effort is sufficient to cause the rear wheels to develop an incipient lock, a skid signal will be generated by the logic switch 74 as explained more fully in the aforesaid copending application Ser. No. 709,706 and amplifier 87 will be energized to energize the relay 114 closing contact 114a, energizing relay 116 and closing contact 116b in series with solenoid 90 and closing holding contact 116a.

The valve 48 will then be shifted to its uppermost position to break the direct connection between conduits 46 and 52 and connect conduit 46 to conduit 52 through branch conduit 50, pressure-reducing valve 49, conduit 51, and valve 48. This action will immediately reduce the pressure applied to the rear wheel brakes in accordance with the characteristics of valve.

The reduction in pressure applied to the rear wheels will eliminate the tendency of these wheels to lock. When this occurs, the signal fed through amplifier 87 will disappear, deenergizing relay 114. Solenoid 90, however, will remain energized because of the holding circuit established through contact 116a Accordingly, if the operator increases the pressure applied to the front wheel brakes, this will have no effect on the rear brakes which will remain actuated under constant pressure. If, however, the operator fully depresses the pedal to develop maximum system pressure at the front wheel brakes, the pressure switch 118 will open to break the circuit through solenoid 90 and relay 116 to permit the valve 48 to shift to its normal position to reestablish the direct connection between the conduits 46 and 52 to allow full braking pressure at the rear wheels even if this results in rear wheel lockup. If when the solenoid 90 is energized, the operator decreases the pressure supplied to the front wheels the pressure of the rear wheels will decrease correspondingly until the main system pressure drops to about 5 p.s.i., at which time switch 112 will open deenergizing the solenoid 90 and restoring the system to its normal condition.

The system thus far described thus achieves the desired brake control without pulsing the air system and thus avoids depletion of the main air system. It requires only relatively simple readily available components and requires for its actuation only a simple electronic signal. Also the system can be tailored to the requirements of a particular vehicle by proper design of the pressure-reducing valve and the valve spring load and adjustment of the point at which the switches 112 and 118 open and close.

Figure 3:
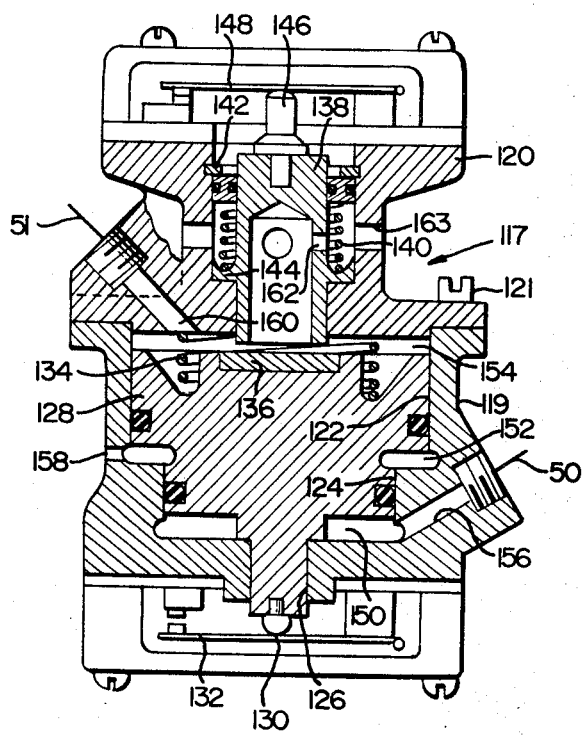
FIG. 3 is a similar view of a modified pressure-reducing valve.

A modified pressure-reducing valve, which may be substituted for the valve 49, to provide slightly different control response is shown in FIG. 3 to which detailed reference will now be made.

The modified valve, indicated generally at 117, comprises a hollow body member 119 to which an upper body member 120 is bolted as at 121. The body member 119 has stepped bores 122, 124 and 126, the latter extending through the bottom of the body. A similarly stepped free piston 128 has portions slidably received in each of the bores and terminates at its lower end in a projection 130 adapted to maintain a switch 132 open when the valve is at its at rest position. The piston 128 normally is urged toward this position by a spring 134.

At its upper end the piston 128 carries a seal element 136 adapted to seat against the bottom end of a tubular stem 138 which extends upwardly through an opening in the cover 120 and is normally urged to the position shown by a spring 140 compressed between a snap ring 142 and a shoulder 144 on the stem 138. The upper end of the stem is provided with a projection 146 adapted to open switch 148 when the stem 138 is displaced upwardly from the position shown.

The valve body 119 and the piston 128 cooperate to provide three chambers 150, 152 and 154, the chamber 150 being connected through a passage 156 to the conduit 50, the chamber 152 being connected to atmosphere through a vent opening 158 and the chamber 154 being connected to the conduit 51 through a passage 160. The chamber 154 is also selectively connected to atmosphere through the hollow interior and vent openings 162 of the stem 138 and vent openings 163 in the cover 120.

Figure 4:
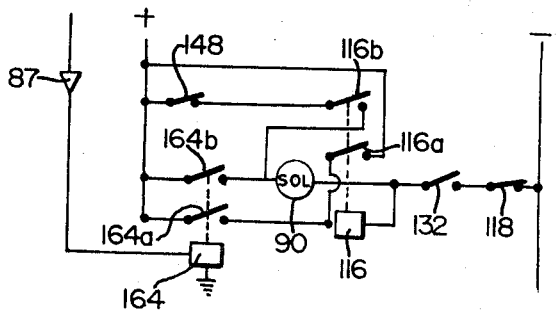
FIGS. 4, 5 and 6 are partial circuit diagrams illustrating modifications of the system of FIG. 1 incorporating the modified valve of FIG. 3.

FIG. 4 illustrates a typical circuit diagram which may be used to incorporate the valve of FIG. 3 in the system of FIG. 1. As before, the skid signal, (developed when an incipient skid condition is detected) is fed to the amplifier 87 which actuates a relay, in this case a double contact relay 164 having relay contacts 164a and 164b, the former adapted to close a circuit through the relay 116 and the latter adapted to close a circuit through the solenoid 90.

When the vehicle brakes are released the valve components occupy the position shown in FIG. 3 and the several switches in the circuit will occupy the FIG. 4 position, i.e. the pressure switch 118 will be closed and the valve-actuated switches 132 and 148 will be open and closed, respectively. When the brakes are initially applied, pressure will be supplied through branch conduit 50 to the chamber 150 and, since chambers 152 and 154 are initially effectively vented, the piston 128 will be displaced upwardly until the seal 136 contacts the stem 138. A predetermined pressure is then established in chamber 154. It will then displace the stem 138 upwardly against the action of spring 140. This action will permit switch 132 to close while opening switch 148. Even if during an intermediate position of the valve components, switch 132 closed before switch 148 opens, the solenoid 90 will not be actuated in the absence of a skid signal since relay 116 is deenergized and contact 116b is open. Accordingly, conduit 46 will be connected directly to conduit 52 and the brakes will operate in a normal manner.

If the rear wheels begin to lock up, a skid signal will be generated which actuates relay 164 closing contacts 164a and 164b, thus energizing relay 116 and solenoid 90 and shifting the valve 48 to connect conduits 51 and 52 and supplying the existing brake pressure to chamber 154. Because of the construction of piston 128, the pressure in chamber 154 will shift the piston downwardly away from the stem 138 to vent chamber 154 through the stem 138 and associated vent openings, thus reducing the pressure at the rear brakes and in chamber 154. This pressure reduction continues until the pressure in chamber 150 times the area upon which it is acting becomes sufficiently greater than the pressure in chamber 154 times the area upon which it is effective to displace the piston 128 upwardly into contact with the lower end of stem 138 to maintain the pressure in chamber 154 and the pressure at the rear brakes at a reduced value.

The reduction in pressure at the rear brakes will eliminate the skid signal and deenergize the relay 164. The solenoid 90 will continue to remain energized since in the intermediate stable position of valve 117 both switches 132 and 148 remain closed.

If the operator then increases the pressure delivered to the brakes, the piston 128 will move upwardly correspondingly increasing the pressure in conduit 51 and thereby the pressure applied to the rear brakes. In this respect the system of FIG. 4 differs from the system of FIG. 1.

If the vehicle operator applies full pressure to the front wheel brakes, the pressure switch 118 will open, deenergizing solenoid 90 thus directly connecting the conduits 46 and 52 permitting application of full braking pressure to the rear wheels as well as the front wheels.

If the braking pressure is decreased while the solenoid 90 is energized, the piston 128 will again be displaced downwardly until the pressure in chamber 154 and the corresponding pressure at the rear wheel brakes is vented to establish a new equilibrium condition. Thus, once the skid signal has been generated, the rear wheel brakes will be applied with a pressure which is lower than the pressure applied to the front wheel brakes. Thus, the system of FIGS. 3 and 4 has all of the advantages of the system of FIGS. 1 and 2 and, in addition, provides for an increase in the braking effort at the rear wheels upon an increase in the braking effort at the front wheels, even after a skid signal has been generated.

Figure 5:
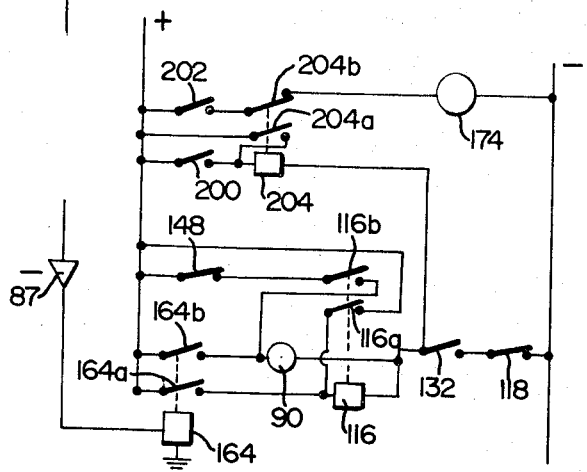
Figure 6:
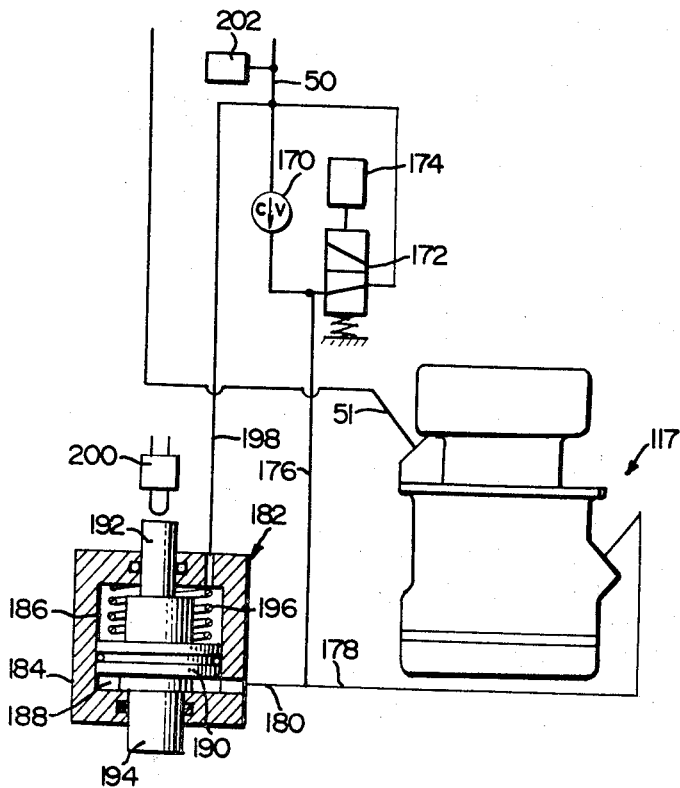

FIGS. 5 and 6, to which detailed reference will now be made, disclose a further embodiment of the invention with slightly different control action.

As in the previously described embodiment, the principal component of this system is the modified pressure-reducing valve 117 with its associated switches 132 and 148. As before, the low-pressure side of the valve is connected through conduit 51 to the solenoid-operated valve 48. The branch line 50 leading to the high-pressure side of the valve 117 includes a check valve 170 in parallel with a normally open valve 172 selectively closed by a solenoid 174. One side of each of the valves is connected to the line 50 and the opposite side of each of the valves is connected to line 176 having a branch 178 leading to the high-pressure side of the valve 117 and a branch 180 leading to auxiliary control assembly indicated generally at 182.

The unit 182 comprises a housing 184, the interior of which is divided into upper and lower chambers 186 and 188 by a piston 190 having upper and lower piston rods 192 and 194 projecting through the upper and lower ends of the housing 184. The parts are so dimensioned that the effective area at the upper surface of the piston is greater than the effective area of the lower surface of the piston so that with equal pressures in chambers 184 and 186 the piston will be biased to its lowermost position, this action being augmented by a spring 196. The upper chamber 186 is connected at all times to the brake pressure line 50 through a branch line 198. A microswitch 200, which is normally open, is mounted opposite the upper end of the piston rod 192 to be closed thereby when the piston 190 is moved from its normal position shown in FIG. 6 to its uppermost position during a braking action.

The system of FIG. 6 also includes a normally open pressure switch 202 connected to the pressure line 50. The switch 202 may be a standard stoplight switch which is normally opened but is closed upon development of any appreciable pressure in the brake system.

The associated electrical circuit as shown in FIG. 5 includes, in addition to the previously described components, a relay 204 including a normally open holding contact 204a and a normally closed contact 204b in series with the pressure switch 202 and the solenoid 174.

The position of all of the components and the switches illustrated in FIGS. 5 and 6 are as they appear when the brakes are released and the system is at rest. As in the previously described system the control remains inactive during normal brake application although such normal brake application closes switches 132 and 202 and opens switch 148.

If the level of braking effort is increased, so a skid signal is generated, the relay 164 is energized to energize solenoid 90 to actuate the valve 48 to connect the rear brakes to the low-pressure side of the pressure-reducing valve 117 through the conduit 51 in the manner previously described. The system thereafter functions in the same manner as the system of FIG. 4 with the following exception.

If the operator reduces the braking pressure following the development of a skid signal the full line pressure is maintained at the high-pressure side of the pressure-reducing valve 117 and in the lower chamber 188 of the control unit 182 since the check valve 170 and the valve 172 which is closed by solenoid 174 actuated by switches 202 and 204b prevent reverse flow of fluid through the conduit 176. The pressure supplied to the upper chamber 186 of the control unit 182, however, is relieved. Thus as the pressure at the front wheel brakes is reduced, the pressure at the rear wheel brakes remains constant. This action will continue until the pressure at the front wheel brakes is reduced sufficiently to permit the piston rod assembly 190, 192 and 194 to move upwardly to close switch 200. The pressure drop increment required to produce this action depends on the physical characteristics of the control unit 182 and the strength of the spring 196.

When the switch 200 is closed, the relay 204 is actuated to close holding contact 204a and open contact 204b in series with solenoid 174. When the solenoid 174 is deenergized, valve 172 is shifted to connect line 176 to the brake line 50 to reduce the pressure supplied to the high-pressure side of the pressure-reducing valve 117 which thereafter acts to reduce the pressure supplied to the rear wheel brakes in the manner previously described.

Thus, this system has the advantage that the effectiveness of the rear brakes is relatively increased as normal braking action is developed following the correction of the skid signal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a brake system for a vehicle having front and rear brake-equipped wheel sets, an operator-controlled valve, a pressure-reducing valve, a main conduit system directly connecting said operator-controlled valve to the brakes for at least one wheel set, an additional conduit system connecting said pressure-reducing valve in parallel with said main conduit system between said operator-controlled valve and said brakes, a control valve interposed in said conduit systems between said pressure-reducing valve and said brakes, normally permitting unrestricted flow between said operator-controlled valve and said brakes, means for generating a signal when the tendency of one or more of said wheels to skid is detected during braking, and means responsive to said signal to shift said control valve to interrupt the connection between said operator-controlled valve and said brakes and connect said brakes to said operator-controlled valve through said pressure-reducing valve.

2. The combination according to claim 1 together with means to maintain said control valve in its shifted position until the brakes are substantially released by said operator-controlled valve.

3. The combination according to claim 1 wherein said pressure-reducing valve includes a variable capacity chamber connected through said control valve to said brakes, means responsive to an increase in the pressure supplied by said operator-controlled valve to decrease the volume of said chamber to increase the pressure applied to said brakes, and means responsive to a decrease in the pressure supplied by said operator-controlled valve to vent said chamber and thereby decrease the pressure supplied to said brakes.

4. In a vehicle brake system in which fluid under pressure is normally supplied from a pressure source to the brakes for front and rear wheel sets through an operator-controlled valve and main brake lines and in which a signal is generated when a tendency of one or more of the wheels of one set to skid is detected during braking: a pressure-reducing valve, means connecting the high-pressure side of said pressure-reducing valve to said main brake lines, an additional control valve movable between a first position in which it permits essentially unrestricted flow in said main brake lines and a second position in which it connects the brakes associated with said one wheel set only to the low-pressure side of said pressure-reducing valve, said valve normally occupying said first position, and means responsive to said signal to shift said valve to said second position.

5. The combination according to claim 4 together with means for maintaining the pressure of fluid supplied to the high-pressure side of said pressure-reducing valve at a fixed value until the pressure in said main brake lines has been reduced a predetermined amount.

6. In a brake system for a vehicle having front and rear brake-equipped wheel sets, an operator-controlled valve, a first conduit system directly connecting said operator-controlled valve to the brakes for one wheel set, a second conduit system connecting said operator-controlled valve to the brakes for the other wheel set, a pressure-reducing valve, means for interposing said pressure-reducing valve in said second conduit system, said conduit systems normally permitting unrestricted flow between said operator-controlled valve and the brakes of both of said wheel sets, means for generating a signal when the tendency of one or more of the wheels of said other set to skid is detected during braking, and means responsive to said signal to actuate said interposing means to interrupt the direct connection between said operator-controlled valve and said brakes of said other wheel set and connect said brakes of said other wheel set to said operator-controlled valve through said pressure-reducing valve whereby said operator-controlled valve remains effective to vary the pressure transmitted to the brakes through both of said conduit systems but at a reduced magnitude to the brakes of said other wheel set.

7. In a vehicle brake system in which pressurized fluid is normally supplied from a pressure source to the brakes for a front vehicle wheel set and at least one rear vehicle wheel set through an operator-controlled valve and in which a signal is generated when a tendency of one or more wheels of one set to skid is detected during braking; a pressure-reducing valve adapted to be selectively connected in series with the brakes associated with said one set of wheels, means responsive to said signal to interrupt the connection between said operator-controlled valve and the brakes associated with said one wheel set and connect said last-mentioned brakes to said operator-controlled valve through said pressure-reducing valve, means for maintaining said pressure-reducing valve in series with the brakes associated with said one wheel set until the brakes are essentially fully released, and means for restoring the connection between said operator-controlled valve and the brakes associated with said one wheel set when the fluid pressure delivered by said operator-controlled valve exceeds a predetermined value.

8. In a vehicle brake system in which pressurized fluid is normally supplied from a pressure source to the brakes for a front wheel set and at least one rear vehicle wheel set through an operator-controlled valve and in which a signal is generated when a tendency of one or more of the wheels of one set to skid is detected during braking; a pressure-reducing valve adapted to be selectively connected in series with said operator-controlled valve and with the brakes associated with said one set of wheels, and means responsive to said signal to interrupt the connection between said operator-controlled valve and the brakes associated with said one wheel set and connect said last-mentioned brakes to said operator-controlled valve through said pressure-reducing valve whereby the pressure applied to said brakes at said one wheel set is a function of the pressure delivered through said operator-controlled valve.

9. The combination according to claim 8 together with means for maintaining said pressure-reducing valve in series with the brakes associated with the said one wheel set until the brakes are essentially released.